United States Patent [19]

Schumacher, II et al.

[11] Patent Number: 5,341,628

[45] Date of Patent: Aug. 30, 1994

[54] CONTROL DEVICE FOR AN OSCILLATINGLY SUPPORTED MACHINE STRUCTURE OF AN AGRICULTURAL MACHINE

[76] Inventors: Gustav Schumacher, II, Gartenstrasse 8; Guenter Schumacher, Raiffeisenstrasse 10, both of D-5231 Eichelhardt, Fed. Rep. of Germany

[21] Appl. No.: 932,258

[22] Filed: Aug. 19, 1992

[30] Foreign Application Priority Data

Aug. 19, 1991 [DE] Fed. Rep. of Germany ....... 4127189

[51] Int. Cl.⁵ ............................................. A01D 47/00
[52] U.S. Cl. .................... 56/10.2 E; 56/14.5; 56/15.8
[58] Field of Search ............. 56/10.2 E, 10.2 F, 14.5, 56/15.2, 15.7, 15.8

[56] References Cited

U.S. PATENT DOCUMENTS

| | | | |
|---|---|---|---|
| 4,151,700 | 5/1979 | Gardella | 56/14.5 X |
| 4,206,582 | 6/1980 | Molzahn et al. | 56/15.8 |
| 4,313,294 | 2/1982 | Martenas | 56/DIG. 10 X |
| 4,565,056 | 1/1986 | Heidjann | 56/15.8 X |

*Primary Examiner*—Terry Lee Melius
*Attorney, Agent, or Firm*—Helfgott & Karas

[57] ABSTRACT

A control device for controlling a cutter table oscillatingly supported on a base unit about an axis of rotation of a harvesting machine, wherein the cutter table is inclinable about the longitudinal axis of a harvester thresher, the inclination being effected by a hydraulically operating cylinder relative to a conveyor channel. The operating cylinder is pivoted at one end to the conveyor channel and, at the other end, to the cutter table. A spring bridges the hydraulically operating cylinder and rests on one end at the operating cylinder and, on the other end, at a piston rod of the operating cylinder and is biased by a bolt nut on a threaded portion of the piston rod so that an imbalance of the cutter table relative to its point of rotation is equalized.

11 Claims, 1 Drawing Sheet

CONTROL DEVICE FOR AN OSCILLATINGLY SUPPORTED MACHINE STRUCTURE OF AN AGRICULTURAL MACHINE

BACKGROUND OF THE INVENTION

The invention relates to control means for a machine structure oscillatingly supported on a base unit about an axis of rotation of an agricultural machine.

In the following specification, the invention is described in connection with a cutter table oscillatingly secured to a harvester thresher as representing all such machine structures such as cutters, mowers or other harvesting machines.

In the operation of a harvester thresher, the cutter table of this machine has, in many cases, so to be guided over the ground that it does not dig into the ground, on the other hand, however, rests with such a residual weight on the ground that it does not lift up in case of ground unevennesses but rather follows these ground unevennesses and cuts the wheat at a uniform height.

In order to determine the residual weight, the cutter tables are supported via springs relative to the undercarriage.

In the past, the cutter table was, in most cases, rigidly secured to the conveyor channel at right angles relative to the longitudinal direction and hence in parallel to the transverse axis of the harvester thresher. For lifting or lowering the cutter table, the conveyor channel was rotated about its transverse axis.

During operation for instance on a side slope when using very broad cutter tables, it can happen that the table digs into the ground of the lower side of the slope because the heavy harvester thresher sinks deeper into the ground with its wheels on the lower side of the slope than on the slope upper side. The machine is thus, with its transverse axis, no longer in parallel to the slope position of the ground. The cutter table which is often double as broad as the machine, subsequently, is nolonger in a ground-parallel inclination either unless it can slue or oscillate about the longitudinal axis of the harvester thresher. On the lower side of the slope it will dig into the ground and on the upper side of the slope it is guided with a distance above the ground.

There are slope equalizing systems on the market which adjust the inclination of the cutter table. Such systems are designed as a freely sluing or oscillating system, wherein the cutter table is kept at optimum inclination by the ground contact pressure or is kept in position by means of power-operated swiveling devices.

Such devices may be provided directly at the conveyor channel and the cutter table may also be part of a two-part adapter, one part of which is assigned to the conveyor channel and the second part of which to the cutter table. The operation of the oscillating device is such that one adapter part can be tilted relative to the second adapter part. Such an adapter oscillator device has the advantage that constructionally neither the conveyor channel nor the cutter table, designed as if no oscillator device was provided, need be altered.

The free oscillation of the cutter table has the advantage that it is the ground contact of the cutter table which determines optimum inclination. Such systems have for instance been known from German Offenlegungsschrift and GDR Patent Specification No. 94,725.

The majority of cutter tables however have so been designed that they are imbalanced relative to the transverse center, since the weight of the drives for cutter knives, draw-in worm and winch has in most cases been provided on one and the same side of the cutter table. In case of free oscillation about a center axis, the cutter table inclines to the heavier side. The operation of the free oscillation is thereby substantially disturbed.

In order to bring about the balance, additional weights have been provided on the lighter side; it is however not of advantage to additionally increase the weight of the cutter table which is per se heavy.

In accordance with German Offenlegungsschrift 35 44 918, a spring mechanism has been described for the provision of the balance of an unbalanced cutter table wherein, via an angle lever, a roller support is obtained on the bracket of the conveyor channel, the roller support being spring-loaded.

Such sophisticated structure is in the first instance very much endangered by damages when the cutter table is coupled in and in the second instance it has to be correspondingly biased in each coupling operation in order to have the spring force available over the total oscillation range.

A similar operation has been described in German Patent Specification No. 2,208,243. But in this case, too, the big disadvantage is to be seen in that when coupling on or off, the balancing spring has either to bias itself, or relax, respectively, or has to be relaxed manually prior to coupling off and biased manually after coupling on. If the spring is automatically biased or relaxed in the coupling operation, there is a substantial danger of accidents since the cutter table has the tendency of adjusting itself about half of the oscillation path at right angles relative to the conveyor channel before it is completely coupled on or off. This effect is produced in that the spring, caused by the spring force varying as a function of the path, does not act uniformly over the whole oscillation path.

When the cutter table is lifted, it is of importance and desirable that the cutter table will swing into its position parallel to the harvester thresher. But it is exactly in this desired smooth oscillation that the problem comes up that without employing corresponding means which lock the oscillation as soon as the table is lifted, the cutter table will move to both sides. This may occur by vibrations of the machine caused by uneven ground but also simply by a variable feeding of the table with the harvested material.

In GDR Patent Specification No. 94,725, German Patent Specifications No. 2,133,746 and No. 2,208,243, stabilizer springs have therefore been described which draw, or press, respectively, an oscillatingly inclined cutter table into the parallel again as soon as the table is taken off ground contact. These springs, however, have to be biased during the oscillation operation and hence impair the desired easy motion of the oscillation movement when copying the ground contour. The ground contact pressure required for guiding the table according to the ground contour has to be selected higher and the resulting disadvantages have to be accepted.

Controlled oscillation is performed by one or two hydraulic cylinders. This can be accomplished by manual control of the hydraulic cylinders or by means of sensors provided on the cutter table trough continuously scanning the distance to the ground and transmitting corresponding control signals to the control valve for the hydraulic cylinder, or hydraulic cylinders. In case of manual control, the problem is that the operator is not aware of the inclination of the table particularly in case of reduced vision because of dust and darkness. The result in many cases is that a substantially different stubble height corresponding to the cutter table width is obtained. This again is of disadvantage for the subsequent treatment of the stubbles.

Sensors, scanners and similar devices detecting the ground contour have the big disadvantage that, in the first instance, they can be provided only too far behind the cutter line and they operate effectively only when the cutter bar has already passed the changed ground contour, and that they cannot, secondly, differentiate between genuine and non-genuine obstacles. A pile of straw or loose earth should not make it react, a heavy stone, for instance should cause the cutter table to oscillate effectively.

The mentioned free oscillation according to the ground contour by the weight of the cutter table supported on the ground is to be preferred in automatic guiding. The two outer shoes which generally extend beyond the front of the cutter line of the cutter table will be sufficient to effect, by their support force on the ground, the oscillation movement of the cutter table. If the position of the cutter table is higher, on the other hand, it is also desirable to readjust the inclination by manual control.

In both cases, however, the cutter table should automatically find its position parallel to the transverse axis of the harvester thresher, if the operator so wishes.

SUMMARY OF THE INVENTION

It is therefore an object of the present invention to provide a control device for a machine structure oscillatingly supported on a base unit around an axis of rotation of an agricultural machine which solves one or a plurality of the following problems:
1. To guide the cutter table freely oscillating at ground contact according to the ground contour;
2. Alternatively, to guide the table by means of sensors;
3. To effect oscillation by manual control, whereby the remaining control positions can be overdriven;
4. To return, automatically and sufficiently solidly, after a corresponding command, or after taking it from ground guidance, the cutter table into its position parallel to the transverse axis of the harvester thresher;
5. To provide by a simple design for the balance of the cutter table relative to its oscillation point of rotation, even if the cutter table per se is not balanced.

The above problems have been solved by means of a control means for a machine structure oscillatingly supported on a base unit about an axis of rotation of a harvesting machine, particularly of the cutter table inclinable about the longitudinal axis of a harvester thresher, the inclination being effected by an hydraulic operating cylinder relative to the conveyor channel which is pivoted at one end to the conveyor channel and at the other end to the cutter table and which is characterized in that a spring bridges the hydraulic operating cylinder and rests, on one end, at the operating cylinder and on the other end at the piston rod of the operating cylinder and by of suitable means, for instance bolt nuts, is so biased on a threaded range of the piston rod that by the force of the spring an imbalance of the cutter table relative to its point of rotation is equalized.

In accordance with a further embodiment, a measuring switching device is provided between the conveyor channel and the cutter table, or between the adapter portion assigned to the conveyor channel and the adapter portion assigned to the cutter table which is influenced by the angle of inclination relative to each other and, via a corresponding switching member, fixes the operating cylinder in such a position that the cutter table takes the parallel position relative to the conveyor channel if the measuring switching device is actuated by a corresponding command.

It has furtheron shown to be suitable if the two pressure spaces of the operating cylinder can simultaneously be connected via a corresponding circuit to the non-chargeable backflow, or the tank of the hydraulic system, respectively.

The cutter table is sluingly supported below the conveyor channel, preferably in the middle of its width. It can, however, also be sluingly supported above the conveyor channel, preferably in the middle of its width; or in accordance with another embodiment the center of gravity of the cutter table can be transferred by a rotating track, or by roller trains, into the middle of the conveyor channel.

In accordance with a further advantageous embodiment of the present invention, control commands can, via sensors such as scanners and/or contact strips, be transmitted to the hydraulic valve and hence to the operating cylinder when the sensor control has been actuated by a corresponding command.

At the same time, the control means according to the invention can be combined with a cutter table height control system wherein the control command "Float position" is combined with the control command "Automatic".

In accordance with another embodiment, the control command "Sensor control" is combined with the control command "Position" of a cutter table height control system; and the control command "Parallel position" is furtheron suitably combined with the control command "Ascend" of a cutter table height control system.

The embodiment discussed above comprising the spring bridging the operating cylinder has the decisive advantage that the adapter spring acts on the cutter table only in the Float position of the operating cylinder. When coupling the cutter table on or off, the adapter portion to be assigned to the cutter table is always adjusted, by means of the operating cylinder, to the same inclination of the table, or the piston rod of the operating cylinder is so adjusted after a coupling operation that the operating cylinder can be connected to the cutter table.

For the free oscillation, the double-effective operating cylinder is so switched into Float position that the two pressure spaces are connected, via a corresponding hydraulic valve, with the free backflow, or with the tank of the hydraulic system.

For automatic parallel positioning of the cutter table, the above referred-to measuring and switching device is provided between the conveyor channel and the cutter table, which so controls an hydraulic three-way valve that it steers the operating cylinder into the desired middle position. By means of the three-way valve, the operator can overdrive any oscillation movement. This is of particular advantage in order to make easier the coupling on and off of the cutter table on the field. The adapter portion assigned to the cutter table can then be readjusted manually into the same inclination the cutter table incidentally takes on the cutter table transportation trailer. On small field paths it is often desirable to incline the table about a certain amount in order to protect it from damages by border stones or other obstacles.

If the cutter table is to be guided by sensors provided for instance at the cutter table trough and covering the distance from the table to the ground, the three-way valve referred to above, after a corresponding command, is controlled by these sensors.

In case of machines wherein a control system is provided which determines, on one hand, the ground contact weight of the cutter table and on the other hand takes a selected position relative to the machine, oscillation and height control can, in accordance with the invention, be combined. This has the advantage that one can use the same commands for various situations. The height controls referred to, in most cases, comprise four control positions: Automatic, Position, Lift, and Descend. On command "Automatic", the cutter table is guided in accordance with the ground contact weight. That is that the cutter table glides on sleds in ground contact over the ground. As soon as the supporting weight increases, for instance because of a ground wave which wants to raise the cutter table, pressure medium is automatically fed to the lift cylinders, or in the reverse case, if the weight decreases, because the table runs into a depression, the pressure medium is removed from the lift cylinders.

In the combination referred to, according to the invention, upon the command "Automatic" the operating cylinder for the oscillation is switched into float position as well. In case of such combination switching, the control of the ground contact pressure is very favourably influenced by the free oscillation since the contact pressure in that case is distributed about the whole cutter table width. It is no longer possible that, because of a non-parallel position of the cutter table relative to the ground, as can be caused by differently sinking in of the wheels into the ground or alone by different tire pressure, the cutter table is supported on the ground on only one sled or one section of the cutter table trough. The so-called residual weight is distributed, in case of freely oscillating cutter tables, over the whole cutter table width.

Upon the command "Position", the cutter table is to be guided in a determined position relative to the harvester thresher. This is mostly practiced if for instance wheat not to be stored is cut with a high stubble. In accordance with the invention, the oscillation system is switched to sensor control. These sensors in most cases comprising flexibly-movable strips under the cutter table trough will so control the operating cylinder that the cutter table is in parallel relative to the ground contour, even if the harvester thresher because of different sinking-in of the wheels is not in parallel to the ground.

Upon the command "Ascend", the measuring and switching device between conveyor channel and cutter table is activated. It so controls the operating cylinder for the oscillation movement that the cutter table moves into the parallel relative to the harvester thresher. The electric control is furthermore so designed that by means of a manual control for the operating cylinder, all other switching positions can be overdriven.

DETAILED DESCRIPTION OF THE PREFERRED EMBODIMENTS

Figures 1, 2, 3:
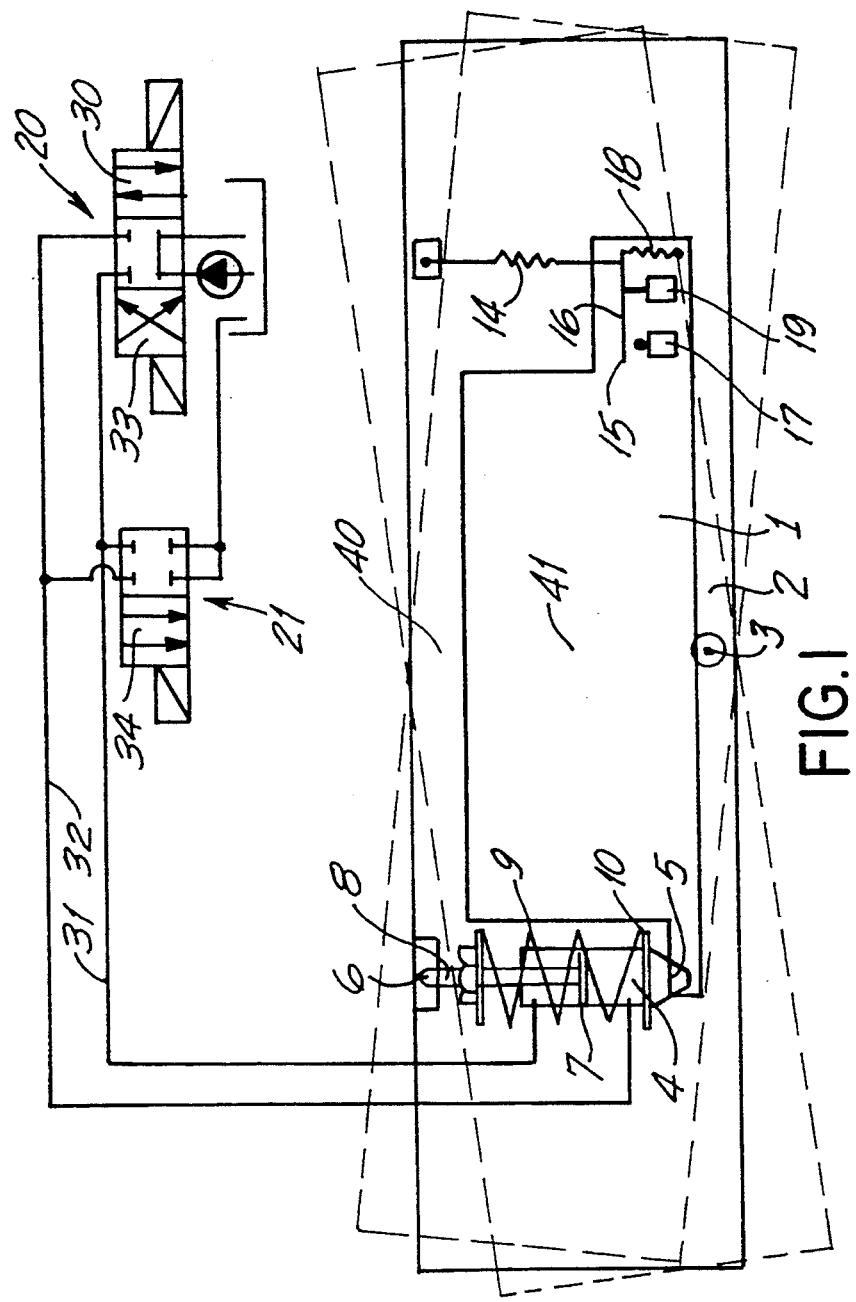
FIG. 1 shows a cutter table connected to the conveyor channel as seen from the harvester thresher, i.e. in the direction of motion, including the circuit diagram according to the invention, the operating cylinder and the oscillation measuring and switching device.
FIG. 2 shows the switching positions of a cross-type switch for the oscillation system.
FIG. 3 shows the switching positions of a cross-type switch for height control of the cutter table.

The cutter table or an adapter portion 2 to be assigned to the cutter table is sluingly supported at, 3, on the conveyor channel or an adapter portion 1 to be assigned to the conveyor channel. In the following, the terms conveyor channel and cutter table only are used for simplification although in many cases a two-part adapter is mounted between the two structures.

A double-acting operating cylinder 4 is pivoted, at 5, to conveyor channel 1 and at 6, to cutter 2. If piston 7 is in the middle of its traversable stroke, cutter table 2 is in parallel relative to conveyor channel 1. If piston rod 8 is driven out beyond the middle position of the piston, the cutter table inclines to the left side as seen in the direction of motion; if it is retracted beyond the middle position of the piston, the table inclines to the right side in each case rotating about point of rotation 3. Assuming that with a view to the power units, the weight of the table relative to its point of rotation 3 is higher on the left side than on the right side, this higher weight is compensated by spring 9 which is secured, at one end, to a shelf 10 of operating cylinder 4 and at the other end to shelf 11 on piston rod of operating cylinder 4. The spring is thus biased with respect to the greater weight on one of the cutter table sides. This bias is adjusted by a threaded bolt 12 on a threaded range of piston rod 8 in accordance with the weight difference relative to point of rotation 3. This adjustment is at its optimum if the cutter table takes its parallel position relative to the conveyor channel, if the pressure spaces of operating cylinder 4 are pressureless or, as will be described later on, are in float position.

Between conveyor channel 1 and cutter table 2, a switching system 13 is provided which emits switching pulses if the table is not in a parallel position relative to the conveyor channel. If the table turns to the left, elastic spring 14 pulls switching lever 15 up above its point of rotation 16 causing switch 17 to close. If the table turns to the right, that is, if it declines to the right side as seen in the direction of motion, spring 18 pulls switching lever 15 down and switch 19 is actuated.

The hydraulic control comprises three-way valve 20 and two-way valve 21 which, normally, is in the locked position as shown on the drawing.

The cross-type switch of FIG. 2 is provided as the control switch. To provide a clearer picture, the electric control cables have not been shown considering that with a view to modern SPS controls and other electronic switching elements, a plurality of possibilities is provided to effect switching pulses and the respective network. In the following, therefore, the individual control switching operations for hydraulic control will be explained only.

The control switch of FIG. 2 includes switch positions L for Left descend, R for Right descend, S for Float position and P for Parallel position.

When switching to L, diagram 30 becomes effective on valve 20. Pressure medium is fed, via duct 31, into the pressure space on the side of the piston rod of operating cylinder 4 and via duct 32, pressure medium is removed from the pressure space on the side of the piston. The table turns to the left, i.e., it descends on the left side. If the control switch is set to R, diagram 33 of valve 20 becomes effective and the table turns to the right, i.e., it descends on the right side. If the control switch is set to S, diagram 34 of valve 21 becomes effective and connects the two ducts 31 and 32 with the tank. The two pressure spaces of operating cylinder 4 become pressureless and the cutter table can freely oscillate about its point of rotation into both directions.

If the control switch is set to P, valve 21 is, firstly, returned to its locked position and, secondly, switching system 13 is actuated. Depending on the oscillation position, this system emits corresponding switching pulses to valve 20, the operating cylinder places itself in the middle position and hence the cutter table 2 in the position parallel to conveyor channel 1.

The control command P can also be used for switching to sensor control. The sensor control referred to comprising scanners or contact strips or other sensors measuring the distance provided under or at the cutter table trough have been known and have therefore not been shown in detail in the drawing.

If a prior art cutter table height control system is provided on the harvester thresher, a cross-type switch according to FIG. 3 is provided. In this case, as already mentioned, a command combination for height and oscillation control is possible. If the control switch according to FIG. 3 is set to A=Automatic, which means that the cutter table is guided with a residual weight in ground contact, command S=Float position, coupled with A, is set as well, that is, valve 21 is set to diagram 34. In case of command L=Position (FIG. 3), the table is guided at a determined height above the ground, i.e., not in ground contact. By means of this command, the oscillation system is also switched to sensor control. If command H=Ascend is switched, the oscillation system receives simultaneously the command for parallel alignment of cutter table 2 relative to conveyor channel 1.

Such combination makes operation of the machine substantially easier for the operator.

In the drawing, the point of rotation of cutter table 2 has been provided below conveyor channel 1, about in the middle of the latter, at 3. It is obvious that the point of rotation can also be provided about the conveyor channel, at about 40. By means of a special bearing on rollers or turnstile, it is also possible to shift the point of rotation to the middle of the conveyor channel (about at 41). If the table is heavier on the right than on the left, operating cylinder 4 can also be provided on the right side of the conveyor channel. Provision of the operating cylinder is also possible above oder under the conveyor channel.

Switching system 13 for automatic parallel positioning can also be provided at all locations where the angle of inclination between conveyor channel and cutter table relative to each other can be used for switching purposes.

It should be noted that switching system 13 as shown constitutes an exemplified embodiment only. This system can be implemented by means of potentiometers, cam shaft gears and numerous other switching elements. The plurality of possibilities, such as capacitance switches, switching members integrated in the operating cylinder, and optical measuring and switching devices are obvious to those versed in the art and need no further explanation.

We claim:

1. A control device for a machine structure oscillatingly supported on a base unit about an axis of rotation of a harvesting machine, including a cutter table inclinable about a longitudinal axis of a harvester thresher, the inclination being effected by a hydraulically operating cylinder relative to a conveyor channel, said cylinder being pivoted at one end to the conveyor channel and at another end to the cutter table, the control device comprising a spring which bridges said hydraulically operating cylinder and rests, on one end, at said operating cylinder and, on the other end, at a piston rod of said operating cylinder and is biased by biasing means including a bolt nut on a threaded part of said piston rod so that by a force of the spring an imbalance of said cutter table relative to a point of rotation thereof is equalized.

2. The control device according to claim 1, wherein a measuring switching device is provided between said conveyor channel and said cutter table, which is influenced by an angle of inclination of said conveyor channel and said cutter table relative to each other and wherein a corresponding switching member fixes said operating cylinder in such a position that said cutter table takes a parallel position relative to said conveyor channel if said measuring switching device is actuated by a corresponding command.

3. The control device according to claim 2, wherein two pressure spaces of said operating cylinder can simultaneously be connected via a corresponding circuit to one of a non-chargeable backflow, and a tank of a hydraulic system, respectively.

4. The control device according to claim 1, wherein said cutter table is oscillatingly supported below said conveyor channel in the middle of a width thereof.

5. The control device according to claim 1, wherein said cutter table is oscillatingly supported above said conveyor channel in the middle of a width thereof.

6. The control device according to claim 1, wherein the center of gravity of said cutter table is transferred by one of a rotating track and roller trains into the middle of said conveyor channel.

7. The control device according to claim 1, and further comprising sensors including one of scanners and contact strips to provide control commands which are transmitted to a hydraulic valve and to said operating cylinder if a sensor control has been actuated by a corresponding command.

8. The control device according to claim 7, wherein a control command for a float position of said table is combined with a control command for an automatic position of a cutter table height control system.

9. The control device according to claim 8, wherein a control command for a sensor control is combined with a control command for a position of a cutter table height control system.

10. The control device according to claim 8, wherein a control command for a parallel position of the cutter table is combined with a control command for ascending of a cutter table height control system.

11. The control device according to claim 1, wherein a measuring switching device is provided between a first adapter portion assigned to said conveyor channel and a second adapter portion assigned to said cutter table, said measuring switching device being influenced by an angle of inclination of said first adapter portion and said second adapter portion relative to each other and wherein a corresponding switching member fixes said operating cylinder in such a position that said cutter table takes a parallel position relative to said conveyor channel if said measuring switching device is actuated by a corresponding command.

* * * * *